US011929053B2

(12) United States Patent
Guo et al.

(10) Patent No.: US 11,929,053 B2
(45) Date of Patent: Mar. 12, 2024

(54) BROADBAND SOUND ABSORBER BASED ON INHOMOGENEOUS-DISTRIBUTED HELMHOLTZ RESONATORS WITH EXTENDED NECKS

(71) Applicant: The Hong Kong University of Science and Technology, Hong Kong (CN)

(72) Inventors: Jingwen Guo, Hong Kong (CN); Xin Zhang, Hong Kong (CN); Yi Fang, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 414 days.

(21) Appl. No.: 17/011,786

(22) Filed: Sep. 3, 2020

(65) Prior Publication Data

US 2021/0074255 A1 Mar. 11, 2021

Related U.S. Application Data

(60) Provisional application No. 62/898,728, filed on Sep. 11, 2019.

(51) Int. Cl.

*G10K 11/168* (2006.01)
*E04B 1/84* (2006.01)
*G10K 11/172* (2006.01)

(52) U.S. Cl.

CPC .............. *G10K 11/168* (2013.01); *E04B 1/84* (2013.01); *G10K 11/172* (2013.01); *E04B 2001/8428* (2013.01); *G10K 2210/32272* (2013.01)

(58) Field of Classification Search

CPC ............... G10K 11/172; G10K 11/168; G10K 2210/32272; E04B 1/84; E04B 2001/8428
See application file for complete search history.

(56) References Cited

U.S. PATENT DOCUMENTS 1,875,074 A 8/1932 Mason
3,786,898 A 1/1974 Fujii
3,866,001 A 2/1975 Kleinschmidt et al.
(Continued)

FOREIGN PATENT DOCUMENTS

CN 102682759 A 9/2012
CN 109356297 A * 2/2019 ........... E04B 1/8404
(Continued)

OTHER PUBLICATIONS

English translation of KR-20200030413-A, accessed Oct. 13, 2022 in USPTO Search tool. (Year: 2020).*
(Continued)

*Primary Examiner* — Jeremy A Luks
(74) *Attorney, Agent, or Firm* — Saliwanchik, Lloyd & Eisenschenk

(57) ABSTRACT

Sound absorbers using distributed absorption units each having an extended neck are provided. The absorption units can be, for example, Helmholtz resonators with extended neck (HRENs). The absorption units can be distributed in a lateral fashion, for example, in a checkerboard fashion with laterally, non-diagonally adjacent units having a different extended neck length and/or diameter. Each absorption unit can be, for example, a cylinder-structure core sandwiched between a back wall and a perforated plate.

13 Claims, 12 Drawing Sheets

(56) References Cited

U.S. PATENT DOCUMENTS

| | | | | |
|---|---|---|---|---|
| 3,887,031 | A * | 6/1975 | Wirt | G10K 11/172 181/292 |
| 3,948,346 | A | 4/1976 | Schindler | |
| 4,091,892 | A | 5/1978 | Hehmann et al. | |
| 4,244,439 | A | 1/1981 | Wested | |
| 4,296,831 | A | 10/1981 | Bennett | |
| 4,821,839 | A | 4/1989 | D'Antonio et al. | |
| 5,401,921 | A | 3/1995 | D'Antonio et al. | |
| 5,457,291 | A * | 10/1995 | Richardson | G10K 11/172 181/294 |
| 5,512,715 | A | 4/1996 | Takewa et al. | |
| 6,290,022 | B1 | 9/2001 | Wolf et al. | |
| 6,450,289 | B1 | 9/2002 | Field et al. | |
| 6,772,859 | B2 | 8/2004 | D'Antonio et al. | |
| 6,793,037 | B1 | 9/2004 | Babuke et al. | |
| 7,510,052 | B2 | 3/2009 | Ayle | |
| 7,540,354 | B2 | 6/2009 | Morin et al. | |
| 8,424,637 | B2 | 4/2013 | Lenz, Jr. | |
| 8,607,925 | B2 | 12/2013 | Gideonse | |
| 8,651,233 | B2 | 2/2014 | Ayle | |
| 8,857,563 | B1 * | 10/2014 | Chang | G10K 11/172 181/286 |
| 9,327,812 | B2 * | 5/2016 | Kim | F04D 3/00 |
| 9,343,059 | B2 * | 5/2016 | Wilson | G10K 11/172 |
| 9,546,602 | B2 | 1/2017 | Julliard et al. | |
| 2005/0167193 | A1 * | 8/2005 | Van Reeth | E01F 8/0082 181/293 |
| 2010/0171022 | A1 * | 7/2010 | Fujimaki | G03F 7/70833 248/559 |
| 2011/0186380 | A1 * | 8/2011 | Beauvilain | B60R 13/08 181/292 |
| 2015/0090526 | A1 * | 4/2015 | Sasaki | G10K 11/16 181/294 |
| 2015/0345497 | A1 * | 12/2015 | Lucas | F04C 15/0049 418/205 |
| 2019/0333492 | A1 * | 10/2019 | Lee | E01F 8/0023 |
| 2020/0202831 | A1 * | 6/2020 | Lee | G10K 11/172 |

FOREIGN PATENT DOCUMENTS

| | | | | |
|---|---|---|---|---|
| HK | 1216447 | A1 | 11/2016 | |
| KR | 20200030413 | A * | 3/2020 | |
| WO | WO-2006118443 | A1 * | 11/2006 | G10K 11/172 |
| WO | WO-2007/073732 | A2 | 7/2007 | |

OTHER PUBLICATIONS

English translation of CN-109356297-A, accessed Mar. 15, 2023 via USPTO Search Tool (Year: 2019).*

Cox, Trevor J. et al., "Acoustic Absorbers and Diffusers: Theory, Design and Application," CRC Press, Mar. 13, 2009, second edition, 495 pages, Taylor & Francis.

Cummer, Steven A. et al., "Controlling sound with acoustic metamaterials," Nature Reviews Materials, 2016, 1(16001):1-13, Macmillan Publishers Limited.

Fok, Lee et al., "Acoustic metamaterials," MRS Bulletin, Oct. 2008, 33(10):931-934.

Ma, Guancong et al., "Acoustic metasurface with hybrid resonances," Nature Materials, Jun. 2014, 13(9):873-878, Macmillan Publishers Limited.

Mei, Jun et al., "Dark acoustic metamaterials as super absorbers for low-frequency sound," Nature Communications, 2012, 3(756):1-7, Macmillan Publishers Limited.

Yang, Z. et al., "Acoustic metamaterial panels for sound attenuation in the 50-1000 Hz regime," Applied Physics Letters, 2010, 96(4):041906-1-041906-3, American Institute of Physics.

Yang, Z. et al., "Membrane-type acoustic metamaterial with negative dynamic mass," Physical Review Letters, 2008, 101(20):204301-1-204301-4, The American Physical Society.

Jiménez, N. et al., "Ultra-thin metamaterial for perfect and quasi-omnidirectional sound absorption," Applied Physics Letters, 2016, 109(12):121902-1-121902-4, AIP Publishing.

Li, Junfei et al., "A sound absorbing metasurface with coupled resonators," Applied Physics Letters, 2016, 109(9):091908-1-091908-4, AIP Publishing.

Jiang, Xue et al., "Ultra-broadband absorption by acoustic metamaterials," Applied Physics Letters, 2014, 105(24):243505-1-243505-5, AIP Publishing.

Ren, S. W. et al., "Ultrathin multi-slit metamaterial as excellent sound absorber: Influence of micro-structure," Journal of Applied Physics, 2016, 119(1):014901-1-014901-8, American Institute of Physics.

Tang, Yufan et al., "Hybrid acoustic metamaterial as super absorber for broadband low-frequency sound," Scientific Reports, 2017, 7(43340):1-10, Springer Nature.

Christensen, J. et al., "Extraordinary absorption of sound in porous lamella-crystals," Scientific Reports, 2014, 4(4674):1-5.

Larouche, Stéphane et al., "Reconciliation of generalized refraction with diffraction theory," Optics Letters, Jun. 15, 2012, 37(12):2391-2393, Optical Society of America.

Yu, Nanfang et al., "Light Propagation with Phase Discontinuities: Generalized Laws of Reflection and Refraction," Science, Oct. 21, 2011, 334(6054):333-337, American Association for the Advancement of Science, Washington, DC.

Champoux, Yvan et al., "Dynamic tortuosity and bulk modulus in airsaturated porous media," Journal of Applied Physics, Aug. 15, 1991, 70(4):1975-1979, AIP Publishing.

Johnson, David Linton et al., "Theory of dynamic permeability and tortuosity in fluid-saturated porous media," Journal of Fluid Mechanics, 1987, 176: 379-402.

Qiao, Jichao et al., "Mechanical Properties of Porous Stainless Steel Metal Fibre Media," Materials Science Forums, 2009, 618-619:109-112, Trans Tech Publications, Switzerland.

Perrot, Camille et al., "Bottom-up approach for microstructure optimization of sound absorbing materials," Journal of Acoustical Society of America, Aug. 2008, 124(2):940-948, Acoustical Society of America.

Perrot, Camille et al., "Dynamic viscous permeability of an open-cell aluminum foam: Computations versus experiments," Journal of Applied Physics, 2008, 103(2):024909-1-024909-8, American Institute of Physics.

Perrot, Camille et al., "On the dynamic viscous permeability tensor symmetry," Journal of Acoustical Society of America, Oct. 2008, 124(4):EL210-EL217, Acoustical Society of America.

Liu, Shutian et al., "Design optimization of porous fibrous material for maximizing absorption of sounds under set frequency bands," Applied Acoustics, 2014, 76:319-328, Elsevier Ltd.

Bolton, J. S. et al., "Measurement of Normal Incidence Transmission Loss and Other Acoustical Properties of Materials Placed in a Standing Wave Tube," & Kjær Technical Review, 2007, (1):1-44.

Inoue, Naohisa et al., "Development of a measurement method for oblique-incidence sound absorption coefficient using a thin chamber," Sep. 2016, No. 421, ICA, Buenos Aires.

Fang, Yi et al., "Sound transmission through an acoustic porous metasurface with periodic structures," Applied Physics Letters, Apr. 2017, 110(17):171904-1-171904-5, AIP Publishing.

Li, Y. et al., Acoustic metasurface-based perfect absorber with deep subwavelength thickness, Applied Physics Letters, 2016, 108:1-5, 2016 AIP Publishing LLC.

Zulkifli, R. et al., Noise Control Using Coconut Coir Fiber Sound Absorber with Porous Layer Backing and Perforated Panel, American Journal of Applied Sciences, 2010, 7(2):260-264, 2010 Science Publications.

Hong, Z. et al., A novel composite sound absorber with recycled rubber particles, Journal of Sound and Vibration, 2007, 304:400-406, 2007 Elsevier Ltd.

Kuo, S. M. et al., "Active Noise Control: A Tutorial Review," *Proceedings of the IEEE*, Jun. 1999, 87(6):943-973, IEEE.

Allard, J. F. et al., "Propagation of Sound in Porous Media: Modelling Sound Absorbing Materials," 2009, Second Edition, pp. 1-374, John Wiley & Sons, Ltd.

Cambonie, T. et al., "Bending a quarter wavelength resonator : Curvature effects on sound absorption properties," *Applied Acoustics*, 2018, 131:87-102, 2017 Elsevier Ltd.

(56) References Cited

OTHER PUBLICATIONS

Ingard, U., "On the Theory and Design of Acoustic Resonators*†," *The Journal of the Acoustical Society of America*, Nov. 1953, 25(6):1037-1061, Acoustical Society of America.
Maa, D., "Potential of microperforated panel absorber," *J. Acoust. Soc. Am.*, Nov. 1998, 104(5):2861-2866, Acoustical Society of America.
Yang, C. et al., "Absorption of oblique incidence sound by a finite micro-perforated panel absorber," *J. Acoust. Soc. Am.*, Jan. 2013, 133(1):201-209, Acoustical Society of America.
Guo, J. et al., "Reflected wave manipulation by inhomogeneous impedance via varying-depth acoustic liners," *Journal of Applied Physics*, 2018, 123:1-10, AIP Publishing.
Ma, G. et al., "Acoustic metasurface with hybrid resonances," *Nature Materials*, Sep. 2014, 13:873-878, Macmillan Publishers Limited.
Li, Y. et al., "Acoustic metasurface-based perfect absorber with deep subwavelength thickness," *Applied Physics Letters*, 2016, 108:1-4, AIP Publishing LLC.
Zhang, C. et al., "Three-Dimensional Single-Port Labyrinthine Acoustic Metalmaterial: Perfect Absorption with Large Bandwith and Tunability," *Physical Review Applied*, 2016, 6:1-8, American Physical Society.
Jiménez, N. et al., "Ultra-thin metamaterial for perfect and quasi-omnidirectional sound absorption," *Applied Physics Letters*, 2016, 109:1-4, AIP Publishing.
Li, D. et al., "Enhancing the low frequency sound absorption of a perforated panel by parallel-arranged extended tubes," *Applied Acoustics*, 2016, 102:126-132, 2015 Elsevier Ltd.
Guo, J. et al., "Manipulating reflected acoustic wave via Helmholtz resonators with varying-length extended necks," *Journal of Applied Physics*, 2018, 124:1-8, AIP Publishing.
Huang, S. et al., "Acoustic perfect absorbers via spiral metasurfaces with embedded apertures," *Applied Physics Letters*, 2018, 113:1-5, AIP Publishing.
Huang, S. et al., "Acoustic perfect absorbers via Helmholtz resonators with embedded apertures," *J. Acoust. Soc. Am.*, Jan. 2019, 145(1):254-262, Acoustical Society of America.
Simon, F., "Long Elastic Open Neck Acoustic Resonator for low frequency absorption," *Journal of Sound and Vibration*, 2018, 421:1-16, Elsevier Ltd.
Sakagami, K. et al., "Pilot study on wideband sound absorber obtained by combination of two different microperforated panel (MPP) absorbers," *Acoust. Sci. & Tech.*, 2009, 30(2):154-156, The Acoustical Society of Japan.
Wang, C. et al., "On the acoustic properties of parallel arrangement of multiple micro-perforated panel absorbers with different cavity depths," *J. Acoust. Soc. Am.*, Jul. 2011, 130(1):208-218, Acoustical Society of America.
Li, J. et al., "A sound absorbing metasurface with coupled resonators," *Applied Physics Letters*, 2016, 109:1-4, AIP Publishing.
Zhao, H. et al., "A slim subwavelength absorber based on coupled microslits," *Applied Acoustics*, 2018, 142:11-17, Elsevier Ltd.
Strutt, J. W. et al., "The Theory of Sound," 1877, 1:1-340, MacMillan and Co.
Stinson, M. R., "The propagation of plane sound waves in narrow and wide circular tubes, and generalization to uniform tubes of arbitrary cross-sectional shape," *J. Acoust. Soc. Am.*, Feb. 1991, 89(2):550-558, Acoustical Society of America.
Karal, F. C., "The Analogous Acoustical Impedance for Discontinuities and Constrictions of Circular Cross Section*," *The Journal of the Acoustical Society of America*, Mar. 1953, 25(2):327-334, Acoustical Society of America.
Ryoo, H. et al., "Dual-frequency sound-absorbing metasurface based on visco-thermal effects with frequency dependence," *Journal of Applied Physics*, 2018, 123:1-9, AIP Publishing.
Verdière, K. et al., "Transfer matrix method applied to the parallel assembly of sound absorbing materials," *J. Acoust. Soc. Am.*, Dec. 2013, 134(6):4649-4658, Acoustical Society of America.
"Acoustics—Determination of sound absorption coefficient and impedance in impedance tubes—Part 2: Transfer-function method," *International Standard*, Nov. 15, 1998, First Edition, pp. 1-11, ISO.
Tam, C. K. W. et al., "Microfluid Dynamics and Acoustics of Resonant Liners," *AIAA Journal*, Aug. 2000, 38(8):1331-1339, the American Institute of Aeronautics and Astronautics, Inc.
Tam, C. K. W. et al., "A Numerical and Experimental Investigation of the Dissipation Mechanisms of Resonant Acoustic Liners," *Journal of Sound and Vibration*, 2001, 245(3):545-557, Academic Press.
Romero-García, V. et al., "Use of complex frequency plane to design broadband and sub-wavelength absorbers," *J. Acoust. Soc. Am.*, Jun. 2016, 139(6):3395-3403, Acoustical Society of America.
Office Action dated Mar. 26, 2020 in U.S. Appl. No. 15/784,385.
Notice of Allowance dated Jun. 17, 2020 in U.S. Appl. No. 15/784,385.
Jiménéz, N. et al., "Rainbow-trapping absorbers: Broadband, perfect and asymmetric sound absorption by subwavelength panels for transmission problems", Scientific Reports, 2017, vol. 7(1)1-12.
Herrero-Durá, I. et al., "Sound Absorption and Diffusion by 2D Arrays of Helmholtz Resonators", Applied Sciences, 2020, 10(5):1-15.

* cited by examiner

BROADBAND SOUND ABSORBER BASED ON INHOMOGENEOUS-DISTRIBUTED HELMHOLTZ RESONATORS WITH EXTENDED NECKS

CROSS-REFERENCE TO RELATED APPLICATION

This application claims the benefit of U.S. Provisional Application Ser. No. 62/898,728, filed Sep. 11, 2019, which is hereby incorporated by reference in its entirety including any tables, figures, or drawings.

BACKGROUND OF THE INVENTION

Noise reduction is of great interest in both scientific and engineering fields. Noise reduction techniques can be broadly divided into the two main categories of active noise control methods and passive noise control methods. Active noise control realizes noise reduction by generating a sound wave with equal amplitude and opposite phase to cancel out the noise source. This is efficient, but it usually needs complete additional controlling devices [1]. Passive noise control is a reliable and low-cost technique that uses sound absorbers, including porous or fibrous materials, resonant-type absorbers such as a quarter wavelength (QW) resonator or Helmholtz resonator, and micro-perforated plates (MPPs) [2,3,4,5,6]. Porous and fibrous materials have satisfactory noise reduction performance for middle- and high-frequency ranges but perform poorly in the low-frequency range. Resonant-type absorbers possess good noise reduction performance at the resonance frequency but suffer from the disadvantage of a narrow operation bandwidth around the resonance frequency. It remains a challenge to design a sound absorber that has compact dimensions while possessing the ability to attenuate low-frequency noise over a large frequency range.

In the past few years, the advent of acoustic metamaterials (AMs) has provided a promising alternative to traditional noise reduction strategies. AMs refer to certain man-made materials exhibiting exotic properties that cannot be realized using naturally existing materials [7]. In order to overcome the limitations of a narrow working frequency band and bulky structure existing in conventional sound absorbers for low-frequency noise, a number of AM-based absorbers have been proposed. Ma et al. reported a decorated membrane resonator with deep-subwavelength scale, which is capable of employing the hybrid resonances achieve nearly total absorption at multiple narrow-band frequencies [8]. Though, the usage of a membrane would disadvantageously increase the risk of unreliability. Another strategy is to bend the cavity of the resonator, and Li and Badreddine designed an acoustic absorber composed of a perforated plate and a coiled coplanar air chamber [9]. Hu et al. designed an absorber with large tunability in bandwidth on the base of the labyrinthine structure [10]. The used coiled structures reduce the thickness of the absorber but inevitably increase the lateral dimension at the same time. Li et al. proposed to attach tube bundles to the perforated/micro-perforated panel [11,12]. Helmholtz resonators have also been used for sound absorption and reflected wave manipulation, and Simon tested the acoustic performance of this type of absorber in the presence of a high grazing flow and concluded the grazing flow had little impact on the impedance value [13,14,15,16]. Considering the characteristics of resonance-based absorbers, these related art absorbers are only effective in narrow bands near the resonance frequencies and are therefore insufficient for practical applications.

BRIEF SUMMARY OF THE INVENTION

Embodiments of the subject invention provide novel and advantageous acoustic treatments (e.g., sound absorbers) using distributed absorption units each having an extended neck. The absorption units can be, for example, Helmholtz resonators with extended neck(s) (HRENs). In particular, the attenuation benefits provided by inhomogeneously distributed HRENs can be used to provide an excellent sound absorber. The absorption units can be distributed in a lateral or parallel fashion, for example, in a checkerboard fashion (see FIG. 1B) with laterally (non-diagonally) adjacent units having: a) a different extended neck length; b) a different diameter of the extended neck; or c) both. That is, referring to FIG. 1B, the resonators labeled A can have a first extended neck length (and/or diameter), and the resonators labeled B can have a second extended neck length (and/or diameter) that is different from the first extended neck length (and/or diameter). Each absorption unit can be, for example, a cylinder-structure core sandwiched between a back wall (e.g., a rigid back wall), and a perforated plate having an extended neck attached thereto (see also, e.g., FIGS. 1A and 13A).

In an embodiment, a sound absorber for noise reduction can comprise a plurality of absorption units, each absorption unit of the plurality of absorption units comprising a cylindrical core disposed between a rigid back wall and a perforated plate having an extended neck attached thereto and extending into the cylindrical core, and the extended neck of each absorption unit of the plurality of absorption units can be different from the extended neck of each laterally, non-diagonally adjacent absorption unit. For example, a length of the extended neck of each absorption unit of the plurality of absorption units is different from a length of the extended neck of each laterally, non-diagonally adjacent absorption unit, or a diameter of the extended neck of each absorption unit of the plurality of absorption units is different from a diameter of the extended neck of each laterally, non-diagonally adjacent absorption unit. The extended neck of each absorption unit of the plurality of absorption units can be different from the extended neck of every other absorption unit in the sound absorber. For example, a length of the extended neck of each absorption unit of the plurality of absorption units is different from a length of the extended neck of every other absorption unit in the sound absorber, or a diameter of the extended neck of each absorption unit of the plurality of absorption units is different from a diameter of the extended neck of every other absorption unit in the sound absorber. The absorption units of the plurality of absorption units can be disposed in a checkerboard fashion, where the extended neck of each absorption unit of the plurality of absorption units is the same as the extended neck of each diagonally adjacent absorption unit, wherein the plurality of absorption units comprises a first type of absorption units with an extended neck with a first parameter value and a second type of absorption units with a second parameter value different from the first parameter value, and wherein all absorption units of the plurality of absorption units are either the first type or the second type. The first parameter value can be a first length of the extended neck and the second parameter value can be a second length of the extended neck. The first parameter value can be a first diameter of the extended neck and the second parameter value can be a second diameter of the extended neck. The second parameter value can be larger than the first parameter value; and a difference between the second parameter value and the first parameter value can be small (e.g., no more than 40% of the second parameter value) or large (e.g., at least 50% of the second parameter value). Each absorption unit of the plurality of absorption units can be made of, for example, metal or a photosensitive resin. Each absorption unit of the plurality of absorption units can achieve a peak absorption of incident acoustic energy at its resonance frequency. A thickness of each absorption unit of the plurality of absorption units can be smaller than a quarter wavelength of an incident wave. A total thickness of the sound absorber can be, for example, subwavelength (e.g., 30 millimeters (mm) or less). The sound absorber can be configured such that incident acoustic energy arrives from a direction parallel to an axial direction of the cylindrical core of each absorption unit of the plurality of absorption units. The plurality of absorption units can be disposed in a square array.

In another embodiment, a method for predicting absorption performance of a sound absorber can comprise performing an equivalent parameter process and a transfer matrix process on each absorption unit of the plurality of absorption units. The sound absorber can be as described herein and can have any of the features described herein.

DETAILED DISCLOSURE OF THE INVENTION

Figure 13A:
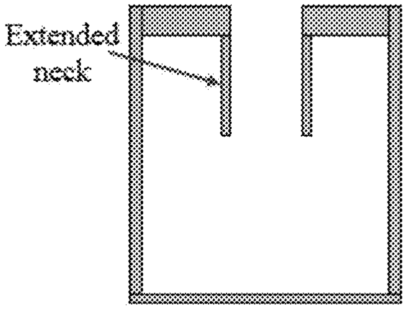
FIG. 13A shows a cross-sectional view of an HERN, as used with absorbers of embodiments of the subject invention.
Figure 13B:
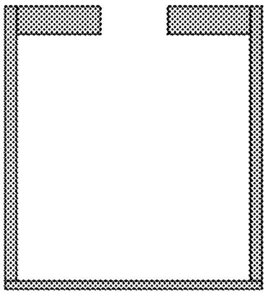
FIG. 13B shows a cross-sectional view of a Helmholtz resonator without an extended neck.

Embodiments of the subject invention provide novel and advantageous acoustic treatments (e.g., sound absorbers) using distributed absorption units each having an extended neck. The absorption units can be, for example, Helmholtz resonators with extended neck (HRENs). In particular, the attenuation benefits provided by inhomogeneously distributed HRENs can be used to provide an excellent sound absorber. The absorption units can be distributed in a lateral or parallel fashion, for example, in a checkerboard fashion (see FIG. 1B) with laterally (non-diagonally) adjacent units having: a) a different extended neck length; b) a different diameter of the extended neck; or c) both. That is, referring to FIG. 1B, the resonators labeled A can have a first extended neck length (and/or diameter), and the resonators labeled B can have a second extended neck length (and/or diameter) that is different from the first extended neck length (and/or diameter). Each absorption unit can be, for example, a cylinder-structure core sandwiched between a back wall (e.g., a rigid back wall), and a perforated plate having an extended neck attached thereto (see also, e.g., FIGS. 1A and 13A). Compared with the Helmholtz resonator without an extended neck as shown in FIG. 13B, the HERN can include an extended neck as seen in FIG. 13A.

Figure 14A:
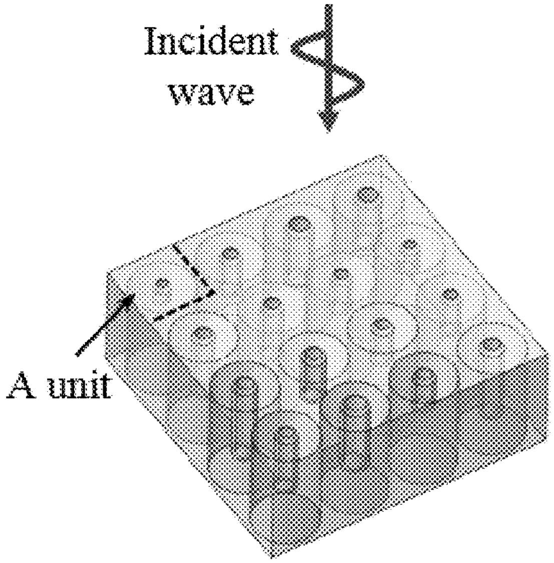
FIG. 14A shows a schematic view of distributed unit HERNs, according to an embodiment of the subject invention. The incident (sound) wave(s) can be parallel to the neck (i.e., the openings of the units can face the direction from which the incident wave(s) arrive).
Figure 14B:
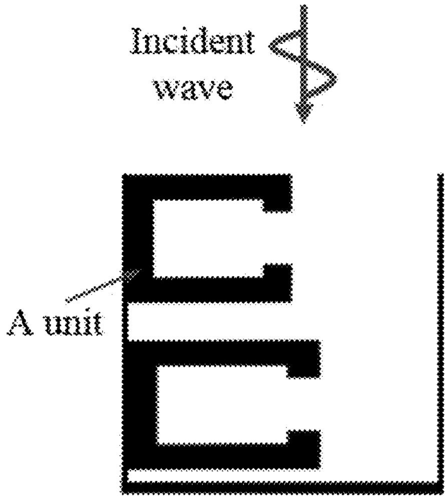
FIG. 14B shows a cross-sectional view of resonator units assembled in a waveguide. The incident (sound) wave(s) can be perpendicular to the opening (i.e., the openings of the units can face a direction perpendicular to that from which the incident wave(s) arrive).

FIG. 14A shows a schematic view of distributed unit HERNs, according to an embodiment of the subject invention. The incident (sound) wave(s) can be parallel to the neck (i.e., the openings of the units can face the direction from which the incident wave(s) arrive). This is different from related art devices that include resonator units assembled in a waveguide, where the incident sound waves are perpendicular to the opening, as shown in FIG. 14B (i.e., the openings of the units can face a direction perpendicular to that from which the incident waves arrive). Referring to FIG. 14A, an array of 4×4 units is shown, but this is for exemplary purposes only; the device can include any quantity of unit absorbers as desired. Each absorption unit can have a different extended neck parameter (extended neck length, extended neck diameter, or both) from all laterally (non-diagonally) adjacent units. It is possible, but not required, that the extended neck parameter (extended neck length, extended neck diameter, or both) is different from all diagonally adjacent units. In some embodiments, extended neck parameter (extended neck length, extended neck diameter, or both) of each absorption unit is different from that of all other absorption units in the device.

The absorber units can be arranged laterally, such that they are distributed in a direction perpendicular to the axis of the cylindrical cavity of each absorber unit. Each absorber unit can be made of, for example, a metal material and/or a photosensitive resin. Each absorber unit can achieve a peak absorption of incident acoustic energy at its resonance frequency resulting from the induced thermo-viscous dissipations due to the strong oscillations occurring near the neck region. The exiting extended neck in each absorption unit can shift each unit's absorption peak to a lower frequency compared with a conventional resonator of the same size without an extended neck. The thickness of each unit absorber can be smaller (e.g., much smaller) than the quarter wavelength of an incident wave, thereby breaking the quarter-wavelength principle followed by most related art acoustic treatments. The absorption units can have different extended necks to therefore give a plurality of adjacent absorption peaks at different frequencies. This can make it possible to construct a broadband sound absorber with a thin thickness. In many embodiments, the thickness of the acoustic treatment (measured in a direction parallel to the axial direction of the absorber units) can be, for example, no more than 30 mm, no more than 25 mm, no more than 20 mm, no more than 15 mm, no more than 10 mm, no more than 9 mm, no more than 8 mm, no more than 7 mm, no more than 6 mm, or no more than 5 mm.

Figure 1A:
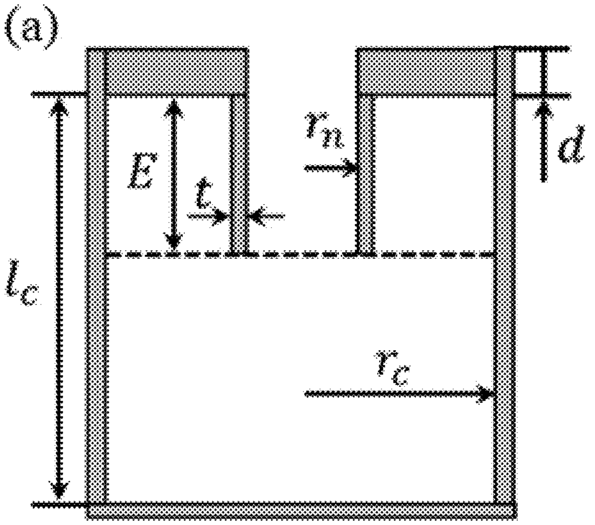
FIG. 1A shows a cross-sectional view of a Helmholtz resonator with extended neck (HREN).

FIG. 1A shows a cross-sectional view of an HREN. In addition, FIGS. 13A and 13B show a comparison between an HREN (FIG. 13A) and a conventional Helmholtz resonator without an extended neck (FIG. 13B). Referring to FIG. 1A, d and $r_n$ are the length and inner radius of the original neck, respectively; E is the length of the extended neck; $I_c$ and $r_c$ are the depth and radius of the backing cavity, respectively; and t is the thickness of the extended neck. An isolated resonator structure has an inherent narrow band of effective sound absorption. In order to broaden the sound absorption bandwidth, multiple inhomogeneous HRENs can be incorporated.

Figure 1B:
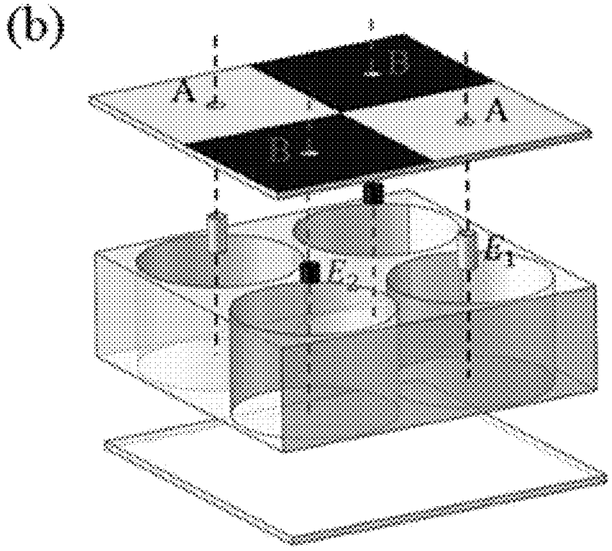
FIG. 1B shows a schematic view of a checkerboard absorber comprising alternating resonators A and B with varying-length extended necks, according to an embodiment of the subject invention.

In an embodiment, a checkerboard-type sound absorber can be used comprising a plurality of HRENs as shown in FIG. 1B. Referring to FIG. 1B, HERNs (labeled as “A” and “B” in FIG. 1B) with different respective extended neck lengths $E_1$ and $E_2$ can be alternated in checkerboard fashion. The design can be symmetric in both the longitudinal and lateral directions. The sound absorption band can be tuned by assigning different $E_1$ and $E_2$. This design of parallel distributed resonators of different types can be extended to larger arrays (e.g., 3×3, 4×4, etc.) as shown in, for example, FIGS. 1C and 1D.

In embodiments with resonators having neck parameters (e.g., two different neck lengths and/or diameters) of two different values (see FIG. 1B), the neck parameters can be adjusted and refined to obtain the desired frequency (or frequencies) and/or bandwidth of sound absorption. For example, by selecting the neck parameters to be close to each other, a wide bandwidth centered around a desired frequency can be obtained (see, e.g., 7A). As another example, by selecting the neck parameters to be far from each other, a dual band absorber device can be obtained (see, e.g., 5A). Here, “close to each other” can mean, for example, where the difference between the neck parameters (e.g., of A and B in FIG. 1B) is a relatively small percentage of the larger value, such as no more than 50%, no more than 45%, no more than 40%, no more than 37%, no more than 35%, no more than 30%, no more than 25%, no more than 20%, no more than 15%, or no more than 10%. Here, “far from each other” can mean, for example, where the difference between the neck parameters (e.g., of A and B in FIG. 1B) is a relatively large percentage of the larger value, such as at least 50%, at least 55%, at least 60%, at least 65%, at least 70%, at least 75%, at least 80%, at least 85%, at least 90%, or at least 95%.

In another embodiment, an analytical prediction model can be established to characterize the acoustic properties of HREN-based absorbers, and the prediction model can be based on the combination of the equivalent parameter method and transfer matrix method. Also, an optimization method (e.g., particle swarm optimization approach) can be used to determine the geometric parameters of each unit in an acoustic treatment as described herein (see, for example, FIGS. 1B, 1C, and 1D), in order to obtain a desired effective absorption in a prescribed frequency range.

A plane wave normally impinging on a HREN unit cell can be considered, as shown in FIG. 1A. The unit cell can be divided into three regions: the neck region (I), the annular duct (II); and the backing cavity (III). Acoustic wave propagation in a circular tube has been studied theoretically based on Kirchhoff theory [21], in which both viscous and thermal effects in the tube are included. However, the solutions from this theory are unnecessarily complicated, thus hindering their engineering applications. To this end, based on the equivalent fluid model with complex density and complex compressibility, an approximate solution to determine the acoustic propagation characteristics of sound through a circular tube can be used [22]. Assuming the diameter of the circular neck is much smaller than the wavelength of the incident wave, the axial velocity equation in the tube can be expressed as $$\frac{1}{r}\frac{d}{dr}\left(r\frac{d\psi}{dr}\right) - \frac{i\omega}{\eta}\psi = -\frac{i\omega}{\eta}, \tag{1}$$

where $\omega=2\pi f$ (f is the frequency) refers to the angular frequency; i is the imaginary unit; $\eta$ is the viscous coefficient of air; and $\psi$ is a generalized variable $\psi=-(i\omega\rho_0/mp)u$, in which p, m, $\rho_0$ and u are the sound pressure, the propagation constant, the density of air and the particle velocity in the axial direction, respectively. The solution of Equation 1 can be expressed as $$\psi(r)=1-J_0[r(-i\omega/\eta)^{1/2}]/J_0[r_w(-i\omega/\eta)^{1/2}], \tag{2}$$

where $r_w$ is the radius of the tube; and $J_0$ is the zero order Bessel function of the first kind. Function $F(\eta)$ is defined by the average of $\psi$ of the cross section of the circular tube $$F(\eta)=\langle\psi\rangle=1-2(-i\omega/\eta)^{-1/2}G[r_w(i\omega/\eta)^{1/2}]r_w, \tag{3}$$

where G is defined by $G(\xi)=J_1(\xi)/J_0(\xi)$. Taking into account the effects of viscosity and thermal conductivity, respectively, the complex density $p_c$ and the complex compressibility $C_e$ functions are defined by $$\rho_e(\Omega)=\rho_0/F(\nu), \tag{4}$$

$$C_e(\omega)=(1/\gamma P_0)[\gamma-(\gamma-1)F(\nu'/\gamma)], \tag{5}$$

where $P_0$ and $\gamma$ denote the pressure of air and the ratio of specific heats; $\nu=\mu/\rho_0$ and $\nu'=\kappa/(\rho_0 C_v)$ in which $\mu$, $\kappa$, and $C_v$ are the viscosity of air, the thermal conductivity of air, and the specific heat at constant volume, respectively. The bulk modulus function is obtained by $K_e(\omega)=1/C_e(\omega)$. The effective impedance and the effective wavenumber of the circular tube are calculated by $$Z_e(\omega)=\sqrt{\rho_e(\omega)K_e(\omega)}/S, \tag{6}$$

$$k_e(\omega)=\omega\sqrt{\rho_e(\omega)/K_e(\omega)}, \tag{7}$$

where S is the surface area of the circular tube. The above calculated equivalent parameters in a circular tube are generally restricted to the range of $r_w>10^{-3}$ cm and $r_w f^{3/2}>10^6$ cm/s$^{-3/2}$ [22].

A plane wave normally impinging on a unit cell can be considered. On the basis of the continuities of pressure and volume velocity, the acoustic properties in the unit cell can be studied by the transfer matrix method $$\begin{bmatrix} p_{in} \\ u_{in} \end{bmatrix} = T_t \begin{bmatrix} p_{out} \\ u_{out} \end{bmatrix} = \begin{bmatrix} T_{11} & T_{12} \\ T_{21} & T_{22} \end{bmatrix} \begin{bmatrix} p_{out} \\ u_{out} \end{bmatrix} \tag{8}$$

where $p_{in}$ and $u_{in}$ are the incoming pressure and normal volume velocity, respectively; $p_{out}$ and $u_{out}$ are the pressure and normal volume velocity, respectively, on the end wall of the backing cavity ($u_{out}=0$); and $T_{11}$, $T_{12}$, $T_{21}$, and $T_{22}$ are the elements of the total transfer matrix $T_t$. $T_t$ can be calculated by three different regions of the unit cell, i.e., the neck (I), the annular duct (II), and the backing cavity (III). The transfer matrices of these three regions can be written as $$T_n = \begin{bmatrix} \cos(k_n l_n) & iZ_n\sin(k_n l_n) \\ i\sin(k_n l_n)/Z_n & \cos(k_n l_n) \end{bmatrix}, \tag{9}$$

$$T_a = \begin{bmatrix} 1 & 0 \\ i\tan(k_a E)/Z_a & 1 \end{bmatrix}, \tag{10}$$

$$T_c = \begin{bmatrix} \cos(k_c D) & iZ_c\sin(k_c D) \\ i\sin(k_c D)/Z_c & \cos(k_c D) \end{bmatrix}, \tag{11}$$

where $Z_n$, $Z_a$, and $Z_c$ are the effective impedance of the neck, the annular duct, and the backing cavity, respectively; $k_n$, $k_a$, and $k_c$ are the corresponding complex wave numbers; and $l_n=d+E$ is the length of the overall neck. The annular duct region is treated as a side branch in the transfer matrix method. Considering that the radius of the extended neck is much smaller than that of the backing cavity, it is reasonable to take $Z_a \approx Z_c$ and $k_a \approx k_c$.

There is an abrupt change of neck cross-section at the connection between the neck and free space, and the discontinuity also occurs at the connection between the neck and the cavity, which will reduce sound radiation. The radiation effect can be represented by an increase in the equivalent length of the neck, i.e., end correction. For two different circular cross sections, taking the discontinuity between neck and cavity for instance, the end correction can be expressed as [23]

$$\delta_{n-c} = 4r_n \sum_{m=1}^{\infty} \frac{J_1^2(x_m r_n/r_c)}{(x_m r_n/r_c)[x_m J_0(x_p)]^2} \tag{12}$$

where $J_1$ is the first order Bessel function of the first kind; and $x_m$ is the $m^{th}$ root of $J_1$ $(x_m)=0$. The infinite series of Equation 12 can be truncated at m=5 [24]. The end correction due to the radiation effect induced by the discontinuity from free space to neck $\delta_{f-n}$ can also be calculated straightforwardly (note that the effective radius of free space is used). The effective length of the neck used in Equation 9 is increased to $l_n'=l_n+\delta_{n-c}+\delta_{f-n}$.

By connecting $T_n$, $T_a$ and $T_c$, the overall transfer matrix of a unit cell can be obtained as $$T_t=T_n T_a T_c \tag{13}$$

Due to the rigid back of the unit cell, the surface impedance of the unit cell can be obtained based on the overall transfer matrix $$Z = \frac{\cos(k_n l_n)\cos(k_c l_c) - Z_n\cos(k_c l_c)\sin(k_n l_n)\tan(k_a E)/Z_a - Z_n\sin(k_n l_n)\sin(k_c l_c)/Z_c}{(i/Z_n)\sin(k_n l_n)\cos(k_c l_c) + (i/Z_a)\cos(k_n l_n)\cos(k_c l_c)\tan(k_a E) + (i/Z_c)\sin(k_c l_c)\cos(k_n l_n)}. \tag{14}$$

For a combination of parallel assembled HRENs, as shown in FIG. 1(*b*), the overall impedance $Z_t$ can be calculated by as follows [25]

$$\frac{S_t}{Z_t} = \sum_{i=1}^{N} \frac{S_i}{Z_i} \tag{15}$$

where N is the total number of HRENs; $S_i$ and $Z_i$ are the area and the surface N impedance, respectively, of i-th HREN; and overall area $S_t = {}^{P}Si$. Once the surface impedance i=1 of the resonator is obtained, the sound absorption coefficient can be evaluated as follows:

$$\alpha = \frac{4\mathrm{Re}(Z_t/\rho_0 c_0)}{\mathrm{Re}(Z_t/\rho_0 c_0)^2 + \mathrm{Im}(Z_t/p_0 c_0)^2}. \tag{16}$$

The requirement for total absorption (i.e., absorption coefficient reaches unity) is to satisfy the impedance matching condition between the background medium and the absorber, i.e., $\mathrm{Re}(Z_t) = \rho_0 c_0$ and $\mathrm{Im}(Z_t) = 0$.

Embodiments of the subject invention provide acoustic treatments (e.g., sound absorbers) using HRENs, as well as analytical prediction models for predicting sound absorption performance of HREN-based absorbers. The analytical prediction models couple the equivalent medium method and the transfer matrix method. The examples section herein show good agreement between analytic predictions, experimental measurements, and numerical simulations, verifying the accuracy of the prediction models. The experimental results also indicate that the extended neck shifts the resonance frequency to a lower frequency compared to a resonator without the extended neck, making the low-frequency absorber based on HRENs possess a thin thickness feature. Thin low-frequency acoustic absorbers comprising a checkerboard arrangement of HRENs with differing-length extended necks can extend the bandwidth of effective absorption. When the alternating resonators in the checkerboard absorber are largely dissimilar, a dual-band absorber is obtained. The dual absorption peaks follow the corresponding uniform HRENs. In order to achieve broadband dissipation, a wide-bandwidth absorber having two (fully) coupled HRENs can also be used. A quasi-perfect absorption property (e.g., absorption coefficient above 0.9) at a relatively wide frequency band (e.g., ranging from 847.2 Hz to 918.7 Hz) can be attained. Due to the thin thickness and adjustable wide absorption bandwidth, absorbers of embodiments of the subject invention are excellent for noise attenuation in practical applications.

Embodiments of the subject invention also provide HREN-based optimized absorbers. A wideband absorber can comprise a combination of inhomogeneous HRENs, such as a 3×3 or 4×4 layout (see FIGS. 1C and 1D). These can possess quasi-perfect absorption (e.g., absorption coefficient above 0.9) in a wide band (e.g., 550 Hz-700 Hz and/or 700 Hz to 1000 Hz). With the limitation of the dimension of the absorber, a trade-off between low frequency absorption and wide-band absorption must be made. The remarkable broadband sound absorption properties combined with the thin thickness (e.g., 20 mm or less) make the absorbers promising candidates for low-frequency noise reduction.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Materials and Methods

Figure 2A:
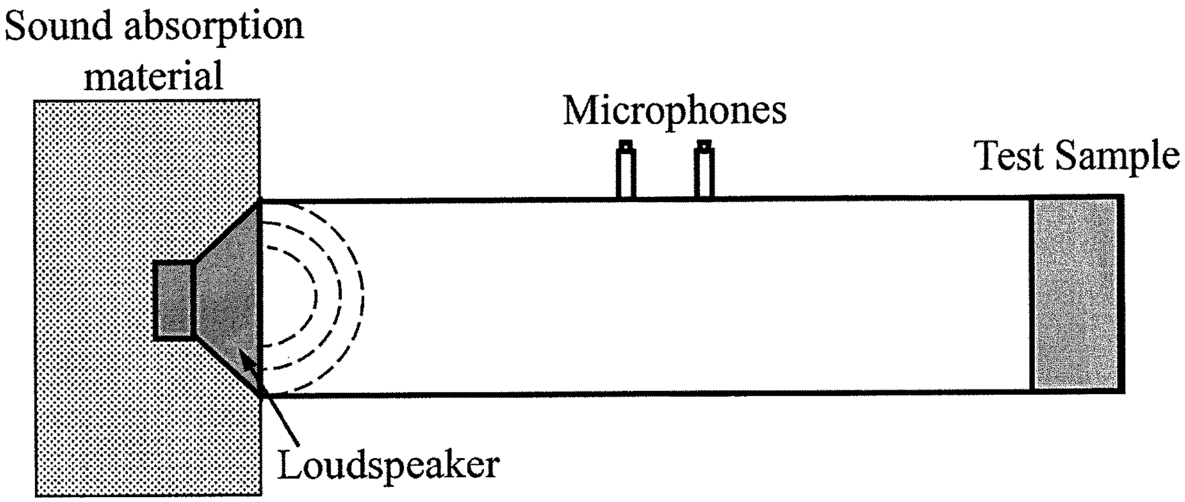
FIG. 2A shows an image of an impedance tube used for experimental measurements.

Sound absorption characteristics of HRENs were measured experimentally using an impedance tube with a square cross-section, as shown in FIG. 2A. The impedance tube was fabricated by using acrylic plates with a thickness of 20 mm. The dimension of the impedance tube was 50 mm×50 mm; thus the plane wave cutoff frequency of the tube was 3430 Hz. A loudspeaker was placed at one end of the impedance tube to generate a random sound source (white noise), and a test sample was placed at the other end. Two ¼-inch microphones (GRAS type-26CB) were flush-mounted separately between the loudspeaker and the test sample, with a distance of 30 mm. Based on the transfer function between two microphones (see also ISO 10534-2 [26], which is hereby incorporated by reference herein in its entirety), the reflection and absorption coefficients of the test sample can be obtained.

Example 1—Uniform HREN

Figure 2B:
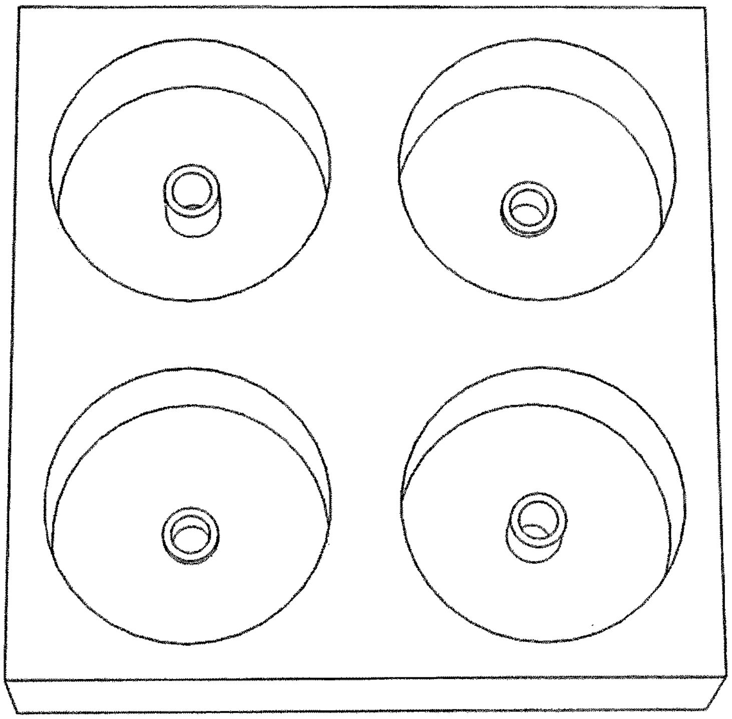
FIG. 2B shows an image of a bottom view of a 3D-printing test sample absorber, with length of extended neck E=4 millimeters (mm).

The acoustic properties of uniform HRENs were investigated. Considering the dimension of the rectangular impedance tube (50×50 mm) used in measurements, the cavity radius of the HREN unit was set as $r_c$=10 mm. Other geometric parameters of the HREN unit were designed as $r_n$=1.4 mm, d=2.5 mm, $l_c$=10.0 mm, and t=0.6 mm. The effect of the key structure parameter, the length of the extended neck (E), on the absorption performance of HREN was studied. A bottom view of a test sample with E=4 mm is shown in FIG. 2B and which included four uniform HRENs. The test sample was fabricated by using a 3D printing technique. The fabricated material is photosensitive resin, with a density of 1210 kg/m$^3$ and with a sound speed of 1024 m/s. They are much larger than that of air, making it reasonable to treat the material as an acoustically rigid medium.

Figure 3:
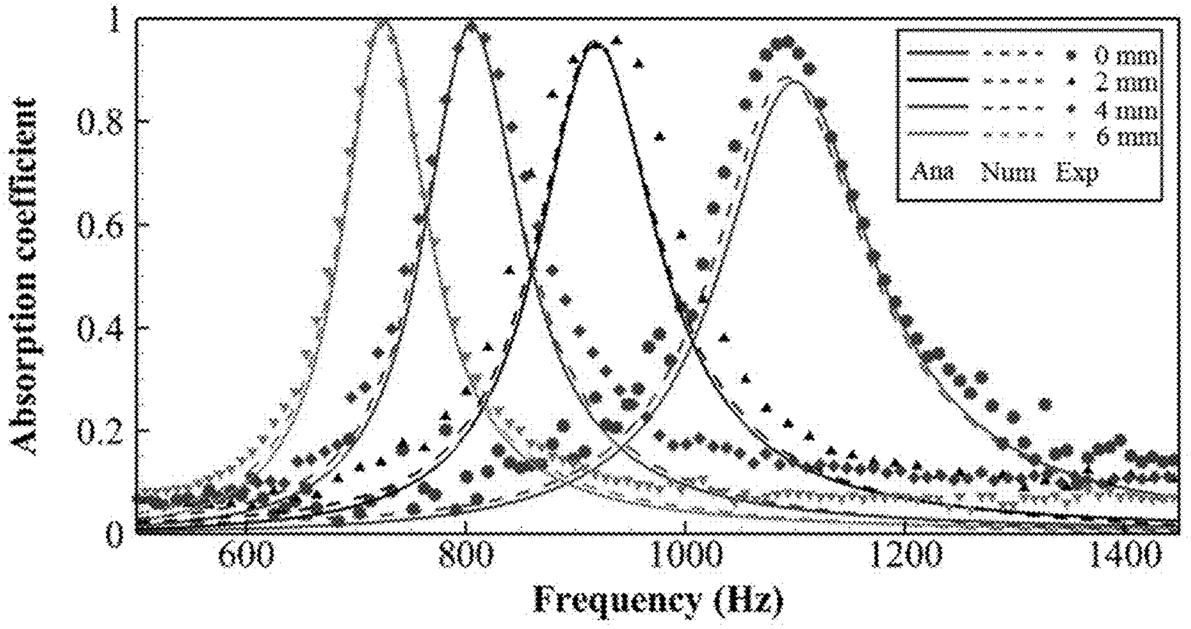
FIG. 3 shows a plot of absorption coefficient versus frequency (in Hertz (Hz)) for HRENs with different extended neck lengths (E=0 mm, 2.0 mm, 4.0 mm, and 6.0 mm). The solid lines are predicted sound absorption, the dashed lines are simulated sound absorption, and the dots are experimental sound absorption. The curve (and corresponding dots) with the peak at the lowest frequency is for E=6.0 mm; the curve (and corresponding dots) with the peak at the second-lowest frequency is for E=4.0 mm; the curve (and corresponding dots) with the peak at the second-highest frequency is for E=2.0 mm; and the curve (and corresponding dots) with the peak at the highest frequency is for E=0 mm.

FIG. 3 shows the sound absorption curves of the uniform HRENs with different extended necks E=0 mm, 2.0 mm, 4.0 mm, and 6.0 mm. The curve (and corresponding dots) with the peak at the lowest frequency is for E=6.0 mm; the curve (and corresponding dots) with the peak at the second-lowest frequency is for E=4.0 mm; the curve (and corresponding dots) with the peak at the second-highest frequency is for E=2.0 mm; and the curve (and corresponding dots) with the peak at the highest frequency is for E=0 mm.

The numerical results were obtained by using finite element method (FEM) software COMSOL Multiphysics, in which the viscous and thermal loss effects were modeled by using the Thermoviscous Acoustics module. Reasonable agreement was achieved between analytical predicted results, numerical results, and experimental measurements, validating the prediction model can predict the absorption performance of HRENs. Some deviations between measurements and predictions/simulations might be attributed to the manufacturing imperfections of the test sample and/or experimental errors such as the gap between the test sample and impedance tube and the imperfect seal of microphones. Based on FIG. 3, the measured maximum sound absorption coefficients of HRENs with E=0.0 mm, 2.0 mm, 4.0 mm, and 6.0 mm are 0.95, 0.96, 0.99, and 0.94 at 1093.8 Hz, 927.3 Hz, 805.7 Hz, and 720.2 Hz, respectively. The introduction of the extended neck shifts the resonance frequency to a lower frequency while the sound absorption peak is kept essentially the same. That is, the HREN achieves excellent sound absorption at a lower frequency in comparison with a conventional Helmholtz resonator (E=0) with an identical thickness.

Figure 4:
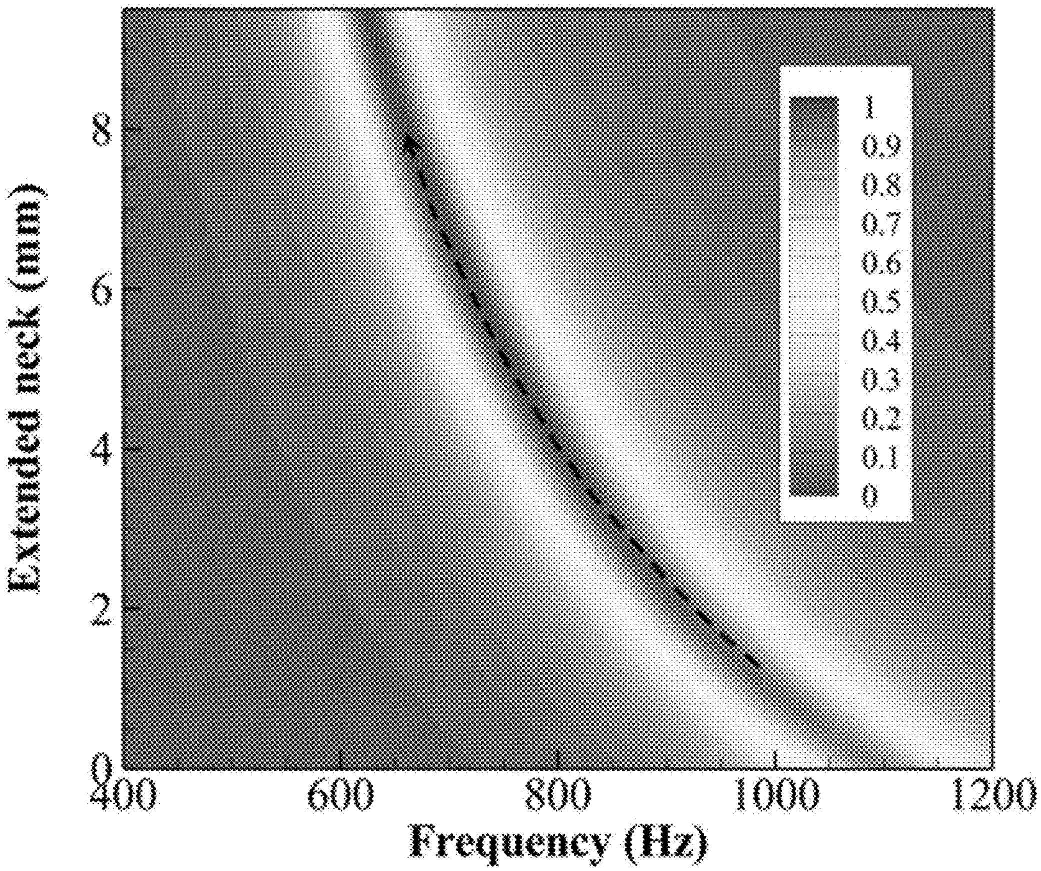
FIG. 4 shows a plot of extended neck (in mm) versus frequency (in Hz) showing predicted sound absorption response.

In order to interpret the effect of E on the absorption property of HREN more clearly, the predicted sound absorption variation with the length of extended neck E is given in FIG. 4. It is seen that with the increase of E, the resonance frequency gradually becomes lower, as indicated by the dashed arrow. Meanwhile, a high absorption coefficient at the resonance frequency is maintained, confirming the tunability of constructing a low-frequency absorber by just adjusting the length of the extended neck.

Example 2—Dual-Band Checkerboard Sound Absorber

Figure 5A:
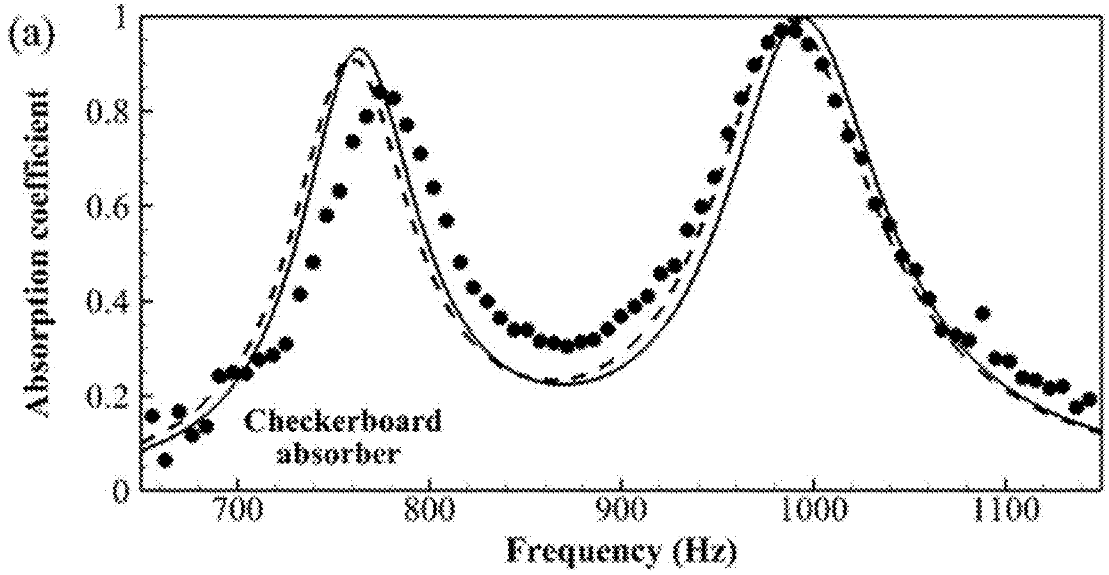
FIG. 5A shows a plot of absorption coefficient versus frequency (in Hz) for a checkerboard absorber as shown in FIG. 1B, with the two extended neck lengths of E=1.0 mm and 5.0 mm. The solid lines are predicted sound absorption, the dashed lines are simulated sound absorption, and the dots are experimental sound absorption.
Figure 5B:
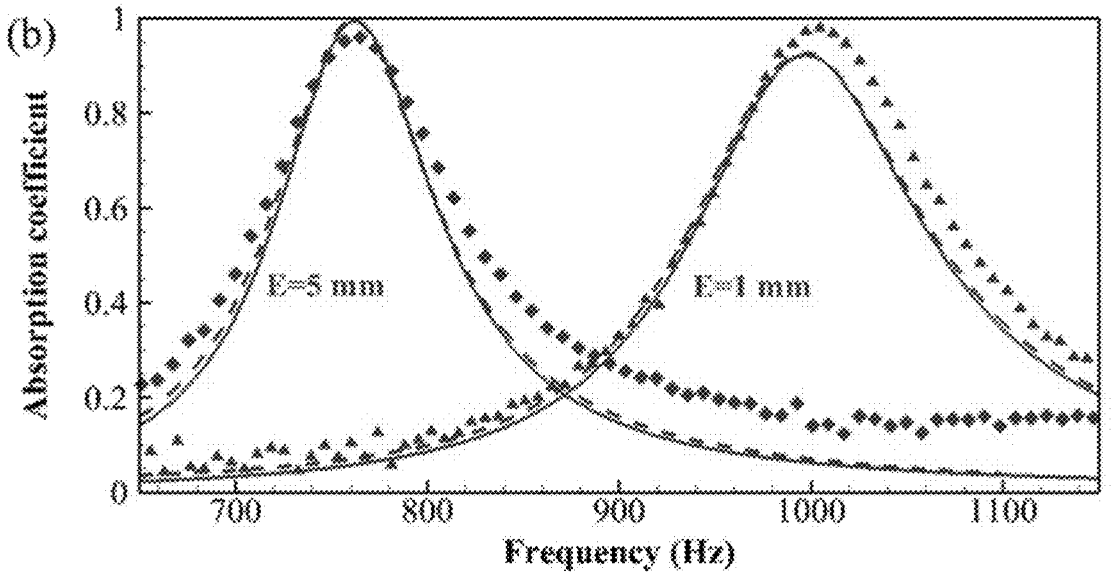
FIG. 5B shows a plot of absorption coefficient versus frequency (in Hz) for two uniform HRENs with respective extended neck lengths of E=1.0 mm and E=5.0 mm. The solid lines are predicted sound absorption, the dashed lines are simulated sound absorption, and the dots are experimental sound absorption.
Figure 7A:
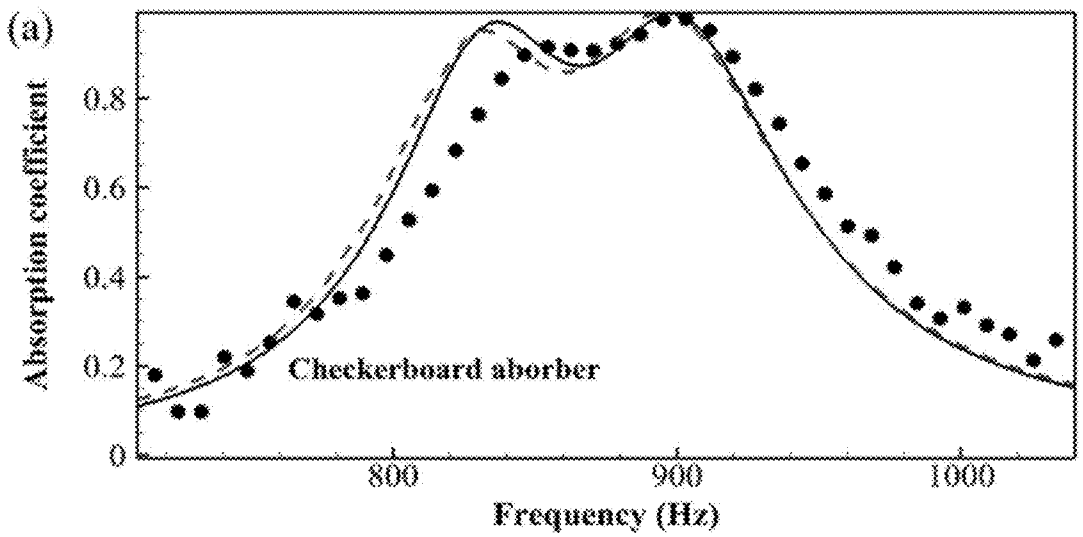
FIG. 7A shows a plot of absorption coefficient versus frequency (in Hz) for a checkerboard absorber as shown in FIG. 1B, with the two extended neck lengths of E=2.2 mm and 3.45 mm. The solid lines are predicted sound absorption, the dashed lines are simulated sound absorption, and the dots are experimental sound absorption.
Figure 7B:
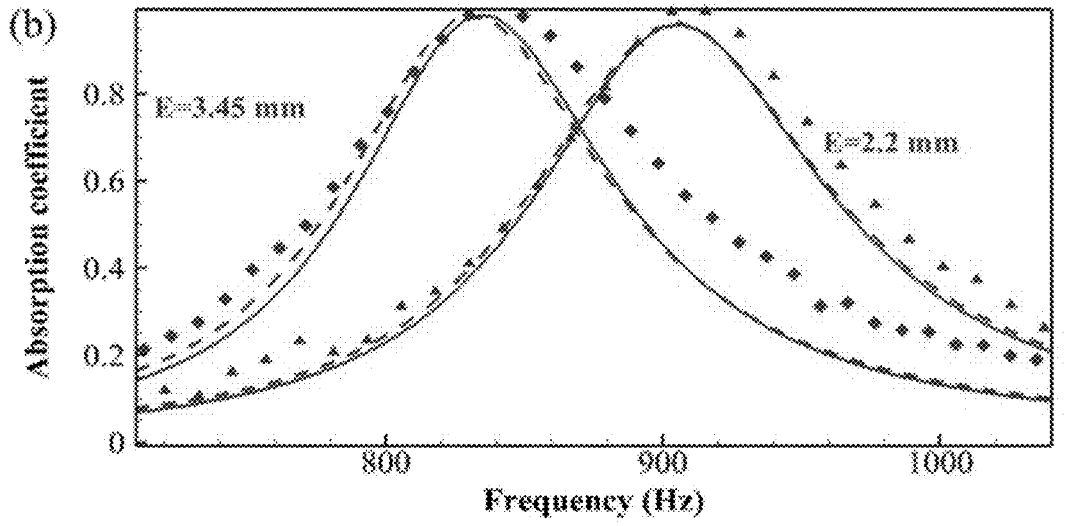
FIG. 7B shows a plot of absorption coefficient versus frequency (in Hz) for two uniform HRENs with respective extended neck lengths of E=2.2 mm and E=3.45 mm. The solid lines are predicted sound absorption, the dashed lines are simulated sound absorption, and the dots are experimental sound absorption.

A sound absorber as shown in FIG. 1B was tested. When the difference between resonance frequencies of resonators A and B is large (i.e., two largely dissimilar resonators are used), a dual-band sound absorber is obtained. Take a sample with $E_1$=1 mm and $E_2$=5 mm for instance. The analytical, numerical, and experimental absorption results of the dual-band absorber are shown in FIG. 5A. For comparison purposes, the absorption curves of two corresponding uniform HRENs are presented in FIG. 7B. Generally, the experimental absorption spectra are consistent with the numerical and analytical results. For the dual-band absorber, two discrete absorption peaks at approximately 764.0 Hz and 994.0 Hz with the absorption of 0.93 and 0.99, respectively, are observed in analytical predictions. Referring to FIG. 7B, the peak frequencies of the dual-band absorber correspond to those of the uniform HRENs (i.e., little frequency shift is observed). The good coincidences indicate that the HRENs in the dual-band absorber behave as discrete resonances, lacking a coupling effect. The underlying mechanism is that due to the resonance frequencies of resonators with $E_1$=1 mm and $E_2$=5 mm being largely different, the difference of the reflected energy between adjacent resonators at each resonance frequency is large, so the coupling between resonators becomes quite weak. In addition, for this dual-band absorber, the overall thickness is about 1/35th of the wavelength at the lower absorption peak.

Figure 6:
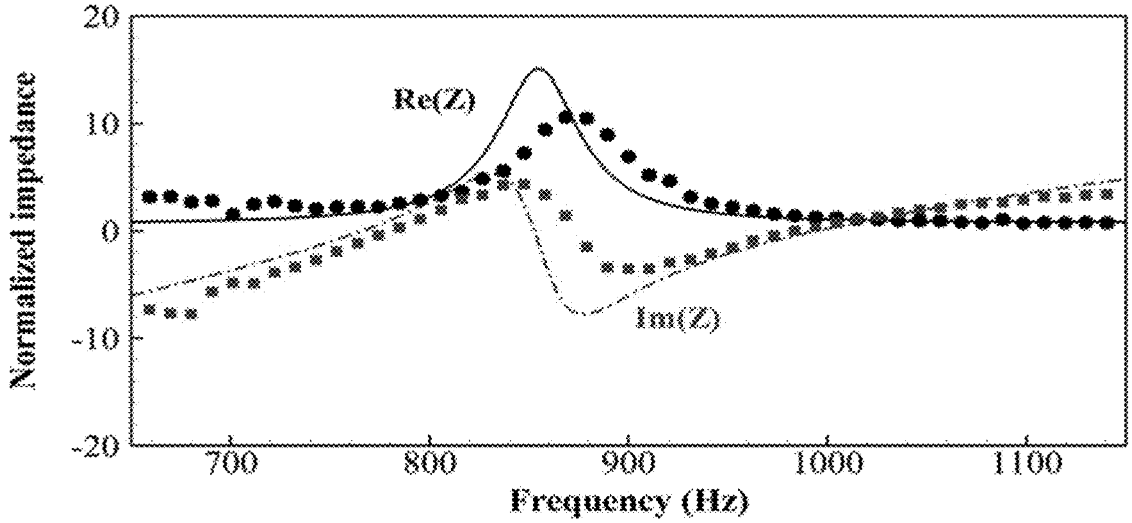
FIG. 6 shows a plot of normalized impedance versus frequency (in Hz) showing real and imaginary parts of the normalized impedance for a dual-band absorber (of FIG. 1B) with the two extended neck lengths of E=1.0 mm and 5.0 mm. The solid lines are for predicted, and the dots are for simulated.
Figure 8:
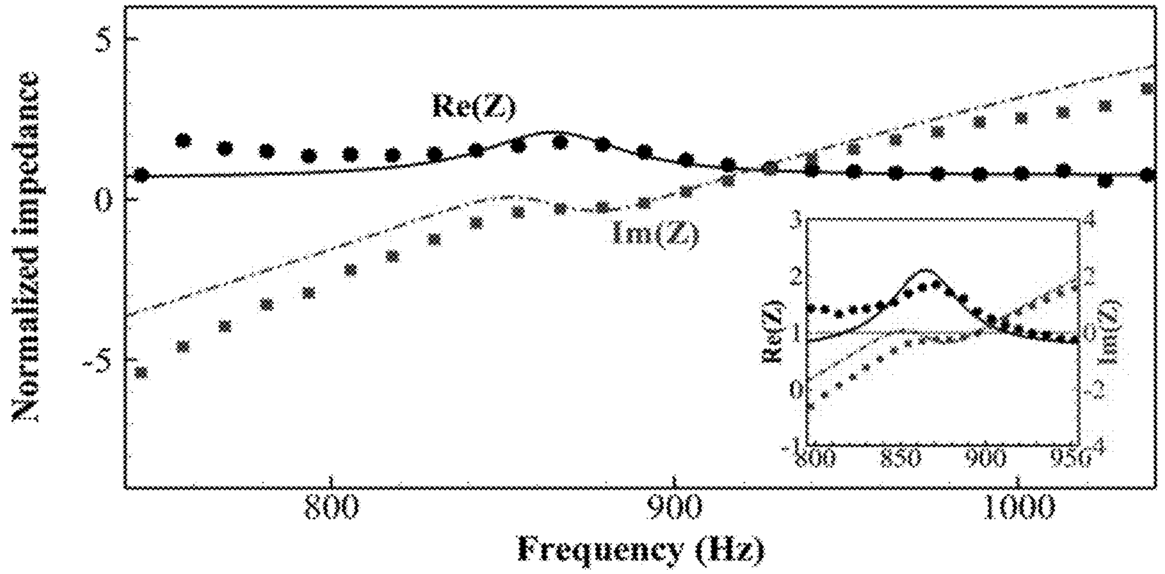
FIG. 8 shows a plot of normalized impedance versus frequency (in Hz) showing real and imaginary parts of the normalized impedance for a dual-band absorber (of FIG. 1B) with the two extended neck lengths of E=2.2 mm and 3.45 mm. The solid lines are for predicted, and the dots are for simulated.

In order to further investigate acoustic characteristics of the absorber, FIG. 6 gives the normalized impedance (by the characteristic impedance of air) of the dual-band absorber, with both the real and imaginary parts included. Referring to FIG. 8, the trends of the impedance curves are predicted well. The measured impedance values at two absorption peaks (777.8 Hz and 987.0 Hz) are 2.20−0.09i and 1.39−0.11i. They are close to the requirement of impedance matching to the background medium (i.e., 1.0+0i, especially for the second absorption peak).

Example 3—Wide Bandwidth Checkerboard Sound Absorber

A sound absorber as shown in FIG. 1B was tested. By adjusting the resonance frequencies of alternating resonators to be close to each other, a wide-bandwidth sound absorber is achieved due to the strong coupling effect between adjacent HRENs. A sample with $E_1$=2.2 mm and $E_2$=3.45 mm was designed and tested. The predicted, simulated, and measured sound absorption coefficients of the wide-bandwidth absorber are given in FIG. 7A. For comparison, the absorption curves of the corresponding uniform HRENs are presented in FIG. 7B. Generally good agreements are found between predictions, simulations, and measurements. The checkerboard absorber achieved good absorption performance that was consistently maintained in the transition band between two absorption peaks induced by two uniform HRENs. The resonance frequencies of HRENs with $E_1$=2.2 mm and $E_2$=3.45 mm were 909.4 Hz and 839.8 Hz, respectively, in the experiments. The measured absolute bandwidth of the wide-bandwidth absorber is 158.4 Hz, which is wider than that of the two uniform HRENs: 139.2 Hz and 148.8 Hz. In addition, the merit of absorption bandwidth expansion by the wide-bandwidth absorber is more obvious for quasi-perfect absorption performance (the absorption coefficient>0.90). The measured quasi-perfect absorption bandwidth asserted by the wide bandwidth absorber is 71.5 Hz in the frequency range of 847.2 Hz to 918.7 Hz, which is 1.63 times and 1.47 times wider than these of the corresponding uniform HRENs, respectively.

In addition, it can be seen from FIG. 8 that the impedance matching condition is nearly satisfied in the quasi-perfect absorption band, resulting in little reflection. Hence, the wide-bandwidth absorber performs better as a whole compared with the corresponding uniform HRENs in terms of the sound absorption bandwidth. The improvements in the absorption bandwidth can be attributed to the coupling of inhomogeneous HRENs in the checkerboard absorber. Also, the thickness of the wide-bandwidth absorber is about 1/32th of the start frequency of the quasi-perfect absorption. It is thus demonstrated that compared with the homogenous HREN, the wide bandwidth absorber possesses the advantages of high sound absorption coefficient in a wider frequency range. The location of the absorption band can be easily tuned by carefully designing the lengths of the extended necks of the checkerboard absorber. The identified features of broadband absorption characteristics and thin thickness make this absorber a promising candidate solution for noise attenuation.

Example 4—Optimized HREN-Based Absorber for Broadband Low-Frequency Sound Absorption (3×3)

Figure 1C:
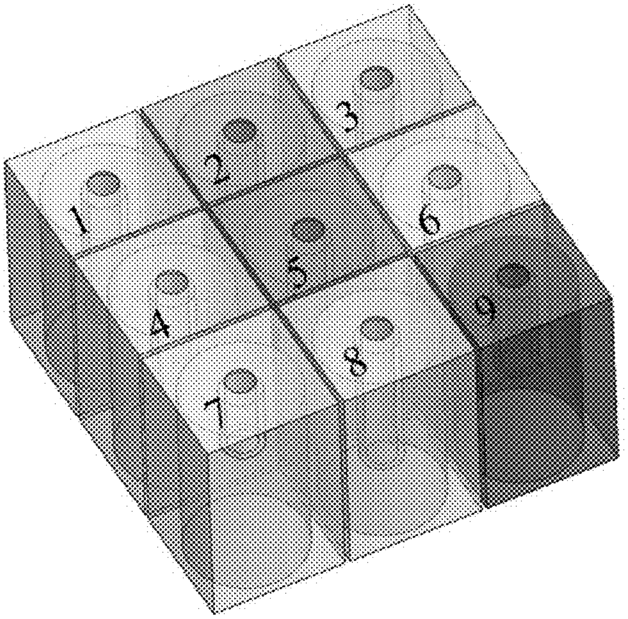
FIG. 1C shows a schematic of a 3×3 absorber according to an embodiment of the subject invention, with unit cells labeled as 1 through 9.
Figure 1D:
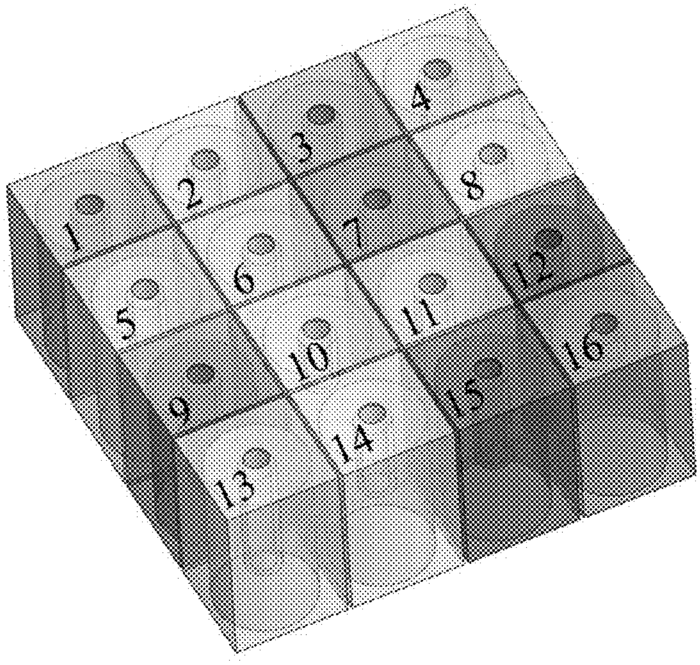
FIG. 1D shows a schematic of a 4×4 absorber according to an embodiment of the subject invention, with unit cells labeled as 1 through 16.

In order to further extend the sound absorption bandwidth of absorbers, the strategy of combining parallel distributed resonators of different types is utilized. For example, a 3×3 absorber and a 4×4 absorber (see Example 5) having 9 and 16 inhomogeneous unit cells, respectively, can be used, as shown in FIGS. 1C and 1D, to demonstrate that the optimized HREN-based absorbers can achieve efficient absorption in low frequency range while keeping a compact size.

From Equations 2 and 3, the geometric parameters have great influence on the sound absorption performance. Four main geometric parameters are $r_n$, E, d, and $l_c$. The absorption tunability inspires the design of a low-frequency broadband absorber. The design principle is to combine an array of parallel assembled resonators with different geometric parameters. It is noted that $l_c$+d determines the overall thickness. In most practical engineering applications, the overall thickness of an absorber is limited. In the experiment, the overall thickness $l_c$+d was fixed as 20 mm. For a HREN unit, the following constraints were imposed $$r_n \in [0.5,2] \text{ mm},$$

$$E \in [0,16] \text{ mm},$$

$$d \in [1,4] \text{ mm},$$

$$l_c + d = 20.$$

If an absorber has N inhomogeneous HRENs, there are 4N geometric parameters to determine. For simplicity, d was kept identical.

To obtain a broadband absorption in a prescribed frequency range $[f_{min}, f_{max}]$ (i.e., the frequency bandwidth is $\Delta f = f_{max} - f_{min}$), the average absorption performance of an absorber in the prescribed frequency range was taken as the object function, i.e., $$\alpha_{avg} = \frac{1}{N_f}\sum_{i=1}^{N_f}\alpha(f_i), \tag{17}$$

where $N_f$ is the number of discrete frequencies used in the prescribed frequency range, and $\alpha(f_i)$ is the absorption coefficient of the absorber at the i-th discrete frequency $f_i$. The purpose of using the PSO optimization is to maximize $\alpha_{avg}$ within a prescribed bandwidth $\Delta f$.

Figure 9:
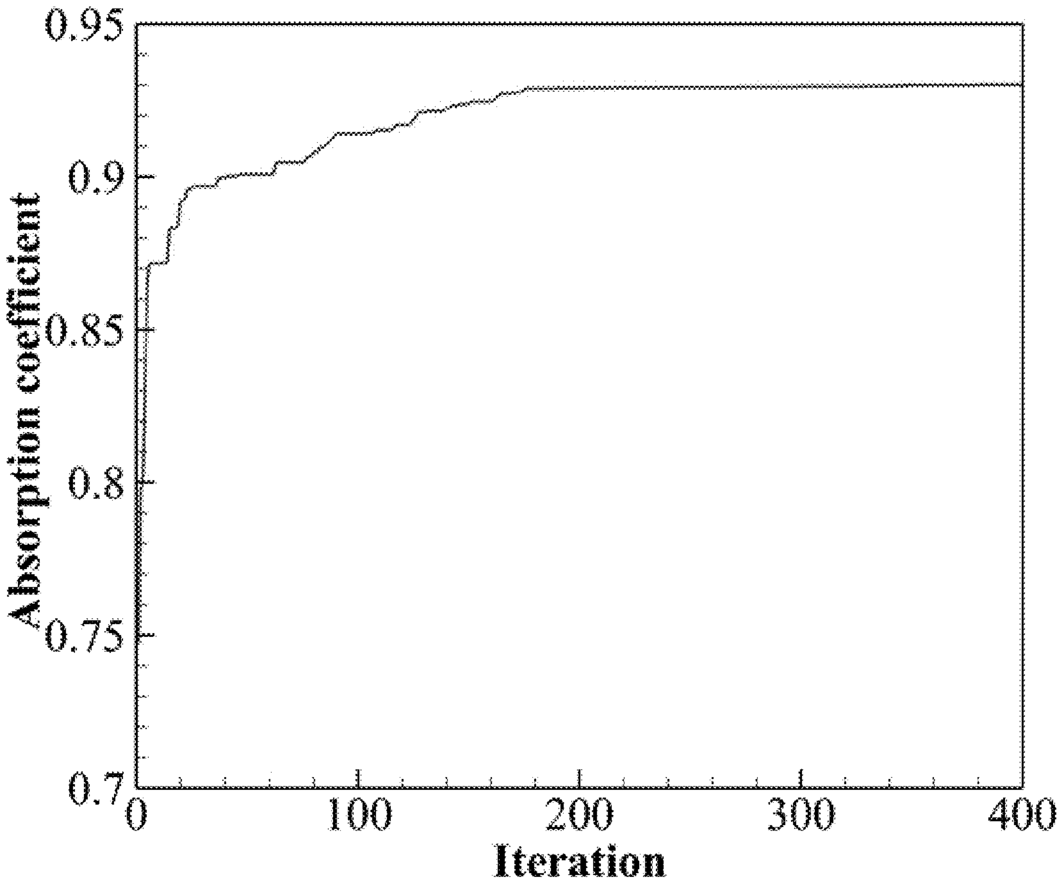
FIG. 9 shows a plot of absorption coefficient versus iteration, depicting an iteration history of an optimization on a 3×3 absorber (see FIG. 1C).

A 3×3 absorber as shown in FIG. 1C was considered first. The prescribed minimum frequency was set as $f_{min}$=550 Hz, and $\Delta f$=150 Hz. The iteration history of the OPS optimization on the 3×3 absorber is shown in FIG. 9. The average absorption coefficient increased fast in the early iteration stage, then became steady. The optimized $r_n$ and E for the 3×3 absorber are given in Table 1, and the optimized d=1.0 mm, leading to an average sound absorption coefficient of 0.93 in the range of 550 Hz to 700 Hz.

Figure 10:
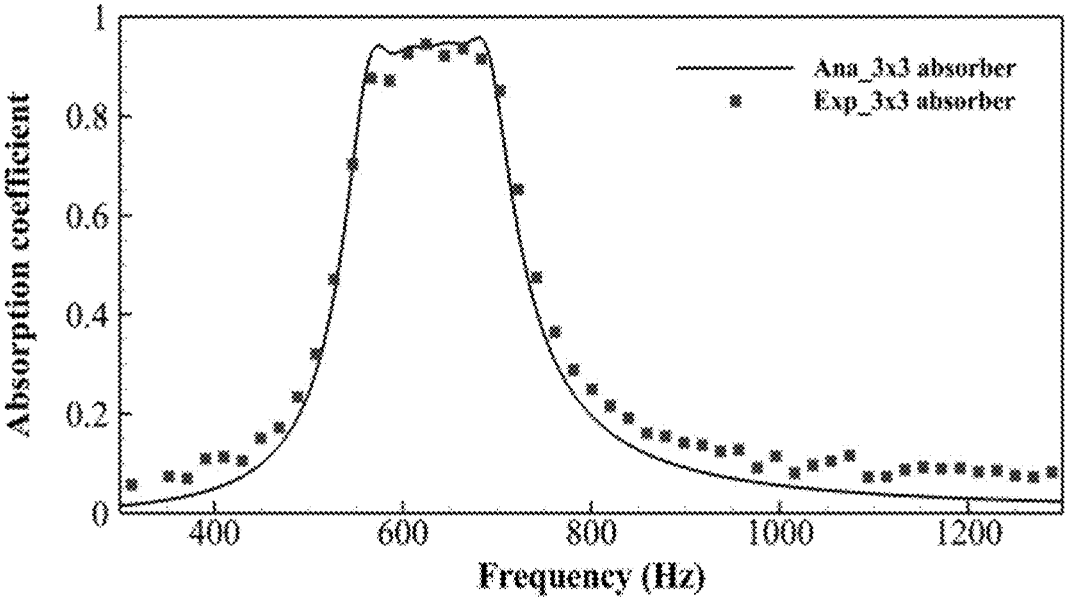
FIG. 10 shows a plot of absorption coefficient versus frequency (in Hz) for a 3×3 absorber as shown in FIG. 1C. The solid lines are predicted sound absorption, and the dots are experimental sound absorption.

The predicted and measured sound absorption coefficients of the 3×3 absorber are shown in FIG. 10. The analytical predictions agree well with the experimental measurements. The small differences between them may be attributed to manufacturing imperfections of the test sample and/or a gap between the impedance tube and the test sample. Referring to FIG. 10, a quasi-perfect absorption (the absorption coefficient above 0.9) was achieved in the prescribed frequency range (550 Hz to 700 Hz). Compared with the uniform HREN, the optimized 3×3 absorber enhanced sound absorption performance in terms of maximum absorption and absorption bandwidth. In addition, the optimal absorber possesses a thin thickness of 20 mm, which is about 1/31 of the absorption wavelength. The high absorption over broad frequency band and the thin thickness indicate the optimized HREN-based absorber holds promise for low-frequency noise control in a limited space.

TABLE 1

Optimized geometric parameters of the 3 × 3 absorber

| Index | 1 | 2 | 3 | 4 | 5 | 6 | 7 | 8 | 9 |
|---|---|---|---|---|---|---|---|---|---|
| $r_n$ (mm) | 1.58 | 1.32 | 1.13 | 1.06 | 1.22 | 1.36 | 1.37 | 1.15 | 1.13 |
| E (mm) | 10.72 | 6.81 | 4.87 | 5.07 | 9.02 | 12.17 | 12.63 | 6.67 | 5.36 |

Example 5—Optimized HREN-Based Absorber for Broadband Low-Frequency Sound Absorption (4×4)

A 4×4 absorber as shown in FIG. 1D was considered. In order to further broaden the absorption bandwidth of the absorber, the strategy of increasing the number of HREN units in the absorber was used. Considering the dimensional size of the impedance tube, the size of the absorber was kept the same as with the 3×3 absorber. Correspondingly, $r_c$ was set as 11 mm. Due to the resonator frequency of HREN being dependent upon the volume of the cavity, the absorption band of the 4×4 absorber will shift to a higher frequency compared to the 3×3 absorber when the thickness is the same. The target frequency range was set as $f_{min}$=700 Hz, and $\Delta f$=300 Hz.

Figure 11:
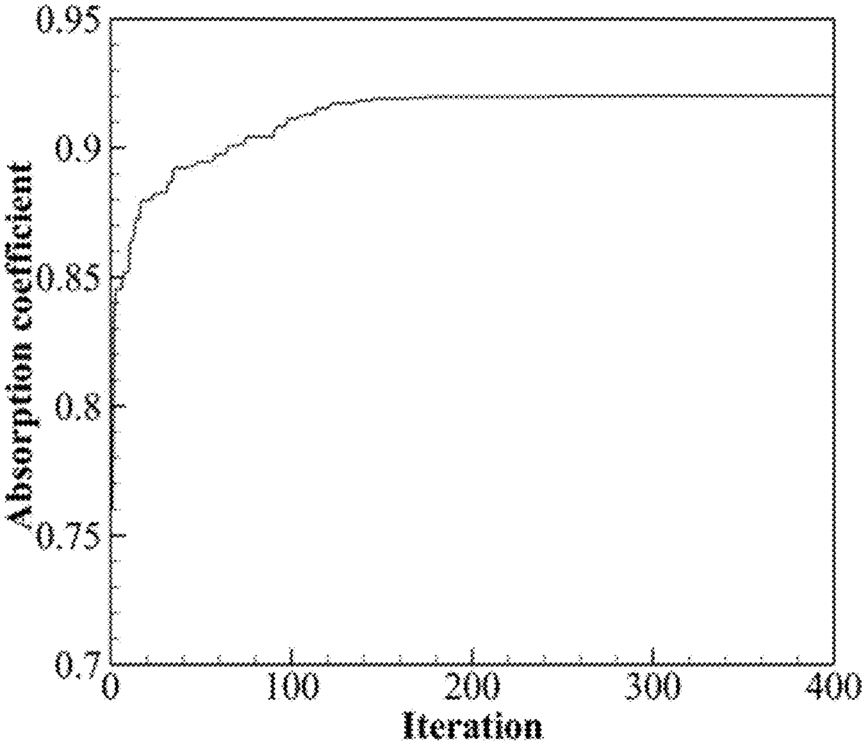
FIG. 11 shows a plot of absorption coefficient versus iteration, depicting an iteration history of an optimization on a 4×4 absorber (see FIG. 1D).
Figure 12:
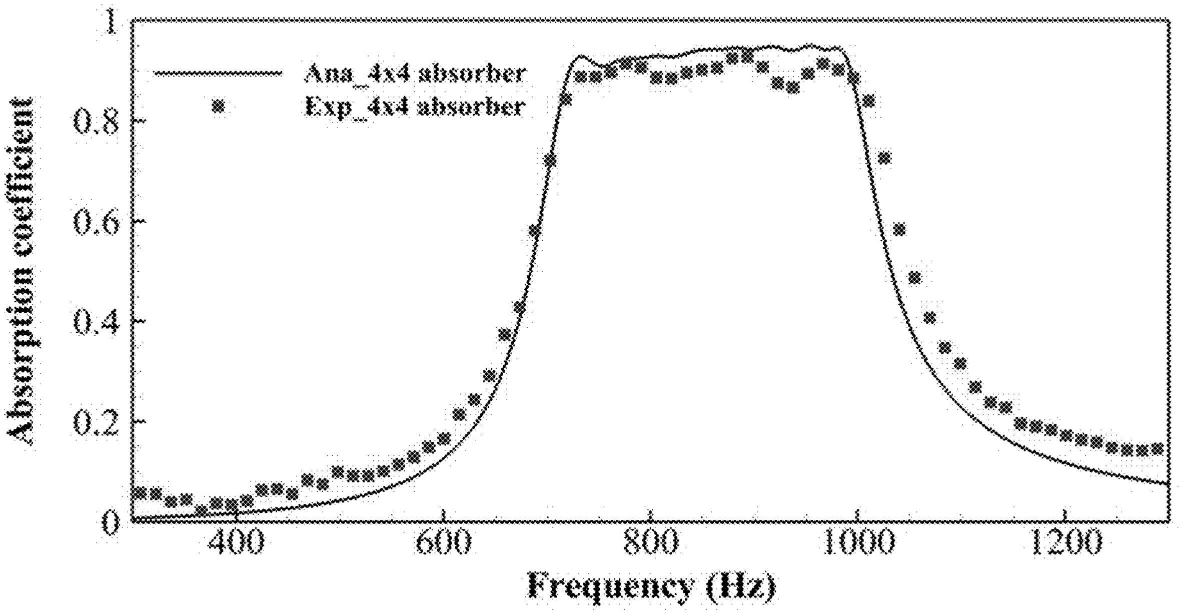
FIG. 12 shows a plot of absorption coefficient versus frequency (in Hz) for a 4×4 absorber as shown in FIG. 1D. The solid lines are predicted sound absorption, and the dots are experimental sound absorption.

The iteration history of the OPS optimization on the 4×4 absorber is shown in FIG. 11. As with the 3×3 absorber, a fast convergence is observed. The optimal parameters for the 4×4 absorber are shown in Table 2, which gives an average sound absorption coefficient of 0.92 in a range of 700 Hz to 1000 Hz. The absorption performance of the optimal 4×4 absorber is shown in FIG. 12. As in the optimal 3×3 absorber case of Example 4, a generally good agreement was achieved between the measurements and the predictions. It can be observed that quasi-perfect absorption is obtained within the frequency band of 700 Hz to 1000 Hz. As discussed, increasing the number of HREN units in the absorber extended the absorption bandwidth.

TABLE 2

Optimized geometric parameters of the 4 × 4 absorber

| Index | $r_n$ (mm) | E (mm) | Index | $r_n$ (mm) | E (mm) |
|---|---|---|---|---|---|
| 1 | 0.93 | 2.41 | 9 | 1.62 | 11.34 |
| 2 | 1.25 | 12.21 | 10 | 1.11 | 6.57 |
| 3 | 1.38 | 15.22 | 11 | 1.18 | 6.94 |
| 4 | 1.22 | 11.33 | 12 | 1.25 | 6.31 |
| 5 | 1.21 | 7.06 | 13 | 1.60 | 10.00 |
| 6 | 1.27 | 10.44 | 14 | 0.95 | 4.20 |
| 7 | 1.35 | 8.62 | 15 | 1.08 | 7.09 |
| 8 | 1.75 | 12.64 | 16 | 1.37 | 14.54 |

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including in the "References" section) are incorporated by reference in their entirety, including all figures and tables, to the extent they are not inconsistent with the explicit teachings of this specification.

REFERENCES

[1] S. M. Kuo, D. R. Morgan, Active noise control: a tutorial review, Proceedings of the IEEE 87 (6) (1999) 943-973.

[2] J. Allard, N. Atalla, Propagation of sound in porous media: modelling sound absorbing materials 2e, John Wiley & Sons, 2009.

[3] T. Cambonie, F. Mbailassem, E. Gourdon, Bending a quarter wavelength resonator: Curvature effects on sound absorption properties, Applied Acoustics 131 (2018) 87-102.

[4] U. Ingard, On the theory and design of acoustic resonators, The Journal of the acoustical society of America 25 (6) (1953) 1037-1061.
[5] D.-Y. Maa, Potential of microperforated panel absorber, the Journal of the 385 Acoustical Society of America 104 (5) (1998) 2861-2866.
[6] C. Yang, L. Cheng, J. Pan, Absorption of oblique incidence sound by a finite micro-perforated panel absorber, The Journal of the Acoustical Society of America 133 (1) (2013) 201-209.
[7] J. Guo, X. Zhang, Y. Fang, R. Fattah, Reflected wave manipulation by in-390 homogeneous impedance via varying-depth acoustic liners, Journal of Applied Physics 123 (17) (2018) 174902.
[8] G. Ma, M. Yang, S. Xiao, Z. Yang, P. Sheng, Acoustic metasurface with hybrid resonances, Nature materials 13 (9) (2014) 873.
[9] Y. Li, B. M. Assouar, Acoustic metasurface-based perfect absorber with deep subwavelength thickness, Applied Physics Letters 108 (6) (2016) 063502.
[10] C. Zhang, X. Hu, Three-dimensional single-port labyrinthine acoustic metamaterial: Perfect absorption with large bandwidth and tunability, Physical Review Applied 6 (6) (2016) 064025.
[11] N. Jimenez, W. Huang, V. Romero-Garcia, V. Pagneux, J.-P. Groby, Ultrathin metamaterial for perfect and quasi-omnidirectional sound absorption, Applied Physics Letters 109 (12) (2016) 121902.
[12] D. Li, D. Chang, B. Liu, Enhancing the low frequency sound absorption of a perforated panel by parallel-arranged extended tubes, Applied Acoustics 102 (2016) 126-132.
[13] J. Guo, X. Zhang, Y. Fang, R. Fattah, Manipulating reflected acoustic wave via helmholtz resonators with varying-length extended necks, Journal of Applied Physics 124 (10) (2018) 104902.
[14] S. Huang, X. Fang, X. Wang, B. Assouar, Q. Cheng, Y. Li, Acoustic perfect absorbers via spiral metasurfaces with embedded apertures, Applied Physics Letters 113 (23) (2018) 233501.
[15] S. Huang, X. Fang, X. Wang, B. Assouar, Q. Cheng, Y. Li, Acoustic perfect absorbers via helmholtz resonators with embedded apertures, The Journal of the Acoustical Society of America 145 (1) (2019) 254-262.
[16] F. Simon, Long elastic open neck acoustic resonator for low frequency absorption, Journal of Sound and Vibration 421 (2018) 1-16.
[17] K. Sakagami, Y. Nagayama, M. Morimoto, M. Yairi, Pilot study on wideband sound absorber obtained by combination of two different microperforated panel (mpp) absorbers, Acoustical science and technology 30 (2) (2009) 154-156.
[18] C. Wang, L. Huang, On the acoustic properties of parallel arrangement of multiple micro-perforated panel absorbers with different cavity depths, The Journal of the Acoustical Society of America 130 (1) (2011) 208-218.
[19] J. Li, W. Wang, Y. Xie, B.-I. Popa, S. A. Cummer, A sound absorbing metasurface with coupled resonators, Applied Physics Letters 109 (9)(2016) 091908.
[20] H. Zhao, Y. Wang, J. Wen, Y. W. Lam, O. Umnova, A slim subwavelength absorber based on coupled microslits, Applied Acoustics 142 (2018) 11-17.
[21] J. W. S. B. Rayleigh, The theory of sound, Vol. 2, Macmillan, 1896.
[22] M. R. Stinson, The propagation of plane sound waves in narrow and wide circular tubes, and generalization to uniform tubes of arbitrary crosssectional shape, The Journal of the Acoustical Society of America 89 (2) (1991) 550-558.
[23] F. Karal, The analogous acoustical impedance for discontinuities and constrictions of circular cross section, The Journal of the Acoustical Society of America 25 (2) (1953) 327-334.
[24] H. Ryoo, W. Jeon, Dual-frequency sound-absorbing metasurface based on visco-thermal effects with frequency dependence, Journal of Applied Physics 123 (11) (2018) 115110.
[25] K. Verdi'ere, R. Panneton, S. Elkoun, T. Dupont, P. Leclaire, Transfer matrix method applied to the parallel assembly of sound absorbing materials, The Journal of the Acoustical Society of America 134 (6) (2013) 4648-4658.
[26] ISO, Acoustics—determination of sound absorption coefficient and impedance in impedances tubes—part 2: Transfer-function method, ISO 10534-2 (1998).
[27] C. K. W. Tam, K. A. Kurbatskii, Microfluid dynamics and acoustics of resonant liners, AIAA journal 38 (8) (2000) 1331-1339.
[28] C. K. Tam, K. A. Kurbatskii, K. Ahuja, R. Gaeta Jr, A numerical and experimental investigation of the dissipation mechanisms of resonant acoustic liners, Journal of Sound and Vibration 245 (3) (2001) 545-557.
[29] V. Romero-Garcia, G. Theocharis, O. Richoux, V. Pagneux, Use of complex frequency plane to design broadband and sub-wavelength absorbers, The Journal of the Acoustical Society of America 139.
[30] Jiménez N, Romero-García V, Pagneux V, et al. Rainbow-trapping absorbers: Broadband, perfect and asymmetric sound absorption by subwavelength panels for transmission problems[J]. Scientific reports, 2017, 7(1): 1-12.
[31] Herrero-Durá I, Cebrecos A, Picó R, et al. Sound Absorption and Diffusion by 2D Arrays of Helmholtz Resonators[J]. Applied Sciences, 2020, 10(5): 1690.

What is claimed is:

1. A sound absorber for noise reduction, comprising:

a plurality of absorption units, each absorption unit of the plurality of absorption units comprising a cylindrical core disposed between an acoustically rigid back wall and a perforated plate extending in a radial direction of the cylindrical core, each absorption unit of the plurality of absorption units further comprising an extended neck attached to the perforated plate and extending from the perforated plate into the cylindrical core in an axial direction of the cylindrical core that is perpendicular to the radial direction, wherein the extended neck of each absorption unit of the plurality of absorption units is different from the extended neck of each laterally, non-diagonally adjacent absorption unit, wherein the perforated plate of each absorption unit of the plurality of absorption units comprises exactly one opening therein connecting an inside of the cylindrical core to an outside of the sound absorber, wherein the absorption units of the plurality of absorption units are disposed in a checkerboard fashion, where the extended neck of each absorption unit of the plurality of absorption units is the same as the extended neck of each diagonally adjacent absorption unit, wherein the plurality of absorption units comprise a first type of absorption unit with an extended neck with a first parameter value and a second type of absorption unit with a second parameter value different from the first parameter value, and wherein all absorption units of the plurality of absorption units are either the first type or the second type.

2. The sound absorber according to claim 1, wherein a length of the extended neck of each absorption unit of the plurality of absorption units is different from a length of the extended neck of each laterally, non-diagonally adjacent absorption unit, the length of the extended neck being a distance in which the extended neck extends from the perforated plate into the cylindrical core in the axial direction.

3. The sound absorber according to claim 1, wherein a diameter of the extended neck of each absorption unit of the plurality of absorption units is different from a diameter of the extended neck of each laterally, non-diagonally adjacent absorption unit.

4. The sound absorber according to claim 1, wherein the first parameter value is a first length of the extended neck and the second parameter value is a second length of the extended neck, the first length of the extended neck being a distance in which the extended neck extends from the perforated plate into the respective cylindrical core in the axial direction, and the second length of the extended neck being a distance in which the extended neck extends from the perforated plate into the respective cylindrical core in the axial direction.

5. The sound absorber according to claim 1, wherein the first parameter value is a first diameter of the extended neck and the second parameter value is a second diameter of the extended neck.

6. The sound absorber according to claim 1, wherein the second parameter value is larger than the first parameter value, and wherein a difference between the second parameter value and the first parameter value is no more than 40% of the second parameter value.

7. The sound absorber according to claim 1, wherein the second parameter value is larger than the first parameter value, and wherein a difference between the second parameter value and the first parameter value is at least 50% of the second parameter value.

8. The sound absorber according to claim 1, wherein each absorption unit of the plurality of absorption units is made of metal or a photosensitive resin.

9. The sound absorber according to claim 1, wherein each absorption unit of the plurality of absorption units achieves a peak absorption of incident acoustic energy at its resonance frequency.

10. The sound absorber according to claim 1, wherein a thickness of each absorption unit of the plurality of absorption units is smaller than a quarter wavelength of an incident wave.

11. The sound absorber according to claim 1, wherein a total thickness of the sound absorber is 30 millimeters (mm) or less, and wherein a distance in which the extended neck, of each absorption unit of the plurality of absorption units, extends from the perforated plate into the cylindrical core in the axial direction is in a range of from 2 mm to 6 mm.

12. The sound absorber according to claim 1, wherein the sound absorber is configured such that incident acoustic energy arrives from a direction parallel to an axial direction of the cylindrical core of each absorption unit of the plurality of absorption units.

13. The sound absorber according to claim 1, wherein the plurality of absorption units are disposed in a square array.

* * * * *